US012808337B2

(12) United States Patent
Zhang et al.

(10) Patent No.: US 12,808,337 B2
(45) Date of Patent: Nov. 24, 2026

(54) VERIFICATION METHOD FOR HIGH-SPEED DIESEL ENGINE EXPERIMENTAL DATA BASED ON QUASI-DIMENSIONAL COMBUSTION MODEL

(71) Applicants: Beijing Institute of Technology, Beijing (CN); Yangtze Delta Region Academy of Beijing Institute of Technology (Jiaxing), Jiaxing (CN)

(72) Inventors: Zhenyu Zhang, Beijing (CN); Yudong Zhang, Beijing (CN); Fujun Zhang, Beijing (CN); Tao Cui, Beijing (CN)

(73) Assignees: Beijing Institute of Technology, Beijing (CN); Yangtze Delta Region Academy of Beijing Institute of Technology (Jiaxing), Jiaxing (CN)

( * ) Notice: Subject to any disclaimer, the term of this patent is extended or adjusted under 35 U.S.C. 154(b) by 0 days.

(21) Appl. No.: 19/290,226

(22) Filed: Aug. 4, 2025

(65) Prior Publication Data

US 2026/0251102 A1 Aug. 27, 2026

(30) Foreign Application Priority Data

Feb. 24, 2025 (CN) ......................... 202510199165.4

(51) Int. Cl.
*F02D 41/26* (2006.01)

(52) U.S. Cl.
CPC .................................... *F02D 41/26* (2013.01)

(58) Field of Classification Search
USPC .......................................................... 701/103
See application file for complete search history.

(56) References Cited

U.S. PATENT DOCUMENTS

2015/0142405 A1* 5/2015 Malischewski ..... F02D 41/0072 703/7
2020/0240347 A1* 7/2020 Niemeyer ........... F02D 41/1406
2022/0381648 A1* 12/2022 Akkermans ........... G01M 15/05

FOREIGN PATENT DOCUMENTS

CN 110261123 A 9/2019
CN 116738680 A 9/2023
(Continued)

*Primary Examiner* — Yi-Kai Wang

(57) ABSTRACT

Disclosed is a verification method for high-speed diesel engine experimental data based on a quasi-dimensional combustion model, including the steps of: S1, establishing a full-engine model; S2, selecting an in-cylinder combustion model and adjusting combustion parameters; S3, comparing simulation data from the model with existing experimental data to determine model accuracy; and establishing the in-cylinder combustion model using a direct injection Wiebe (DIWiebe) function if unsatisfactory, and adjusting combustion parameters using simulation data generated by this DIWiebe model; S4, comparing the simulation data from the adjusted model with the existing experimental data to determine model accuracy; entering S5 if the accuracy meets requirements; and establishing the in-cylinder combustion model using thermodynamic process analysis (TPA) if still unsatisfactory, and adjusting combustion parameters; and S5, verifying the experimental data using the calibrated model. The experimental data accuracy may be assessed without requiring repeated full-engine testing, significantly reducing diesel engine development costs.

6 Claims, 7 Drawing Sheets

(56) References Cited

FOREIGN PATENT DOCUMENTS

| | | | |
|---|---|---|---|
| CN | 118862424 | A | 10/2024 |
| DE | 102014118125 | B3 | 5/2016 |

* cited by examiner

VERIFICATION METHOD FOR HIGH-SPEED DIESEL ENGINE EXPERIMENTAL DATA BASED ON QUASI-DIMENSIONAL COMBUSTION MODEL

CROSS-REFERENCE TO RELATED APPLICATION

This application claims priority of Chinese Patent Application No. 202510199165.4, filed on Feb. 24, 2025, the entire contents of which are incorporated herein by reference.

TECHNICAL FIELD

The present disclosure belongs to the technical field of internal combustion engines, and specifically to a verification method for high-speed diesel engine experimental data based on a quasi-dimensional combustion model.

BACKGROUND

The accuracy of diesel engine experimental data can directly determine the fidelity of one-dimensional (1D) simulations. Experimental data with excessive errors can lead to complete divergence between model simulations and experimental data results. Therefore, the accuracy of the experimental data is crucial for 1D simulations. Current verification methods for experimental data predominantly rely on repeated full-engine testing for correction. However, there is no simulation-based approach available for validating the experimental data itself.

Although more accurate experimental data can be obtained through repeated full-engine testing and erroneous data can be corrected to the maximum extent, this full-engine testing not only has prohibitively long cycles but also incurs high experimental costs, wasting human and material resources, thereby increasing diesel engine development expenditures.

SUMMARY

The present disclosure aims to solve at least one of the technical problems in the related art to some extent.

Therefore, an objective of the present disclosure is to provide a verification method for high-speed diesel engine experimental data based on a quasi-dimensional combustion model. This method can assess the accuracy of experimental data without requiring repeated full-engine testing, thereby significantly reducing diesel engine development costs.

To solve the technical problems, the present disclosure is implemented as follows.

An embodiment of the present disclosure provides a verification method for high-speed diesel engine experimental data based on a quasi-dimensional combustion model, including the steps of:

S1, establishing a first diesel full-engine model using a GT-POWER combustion model based on existing data from diesel full-engine testing;

S2, selecting an in-cylinder combustion model based on existing experimental cylinder pressure data and heat release rate curve data, and adjusting combustion parameters of the selected model to obtain a first in-cylinder combustion model;

S3, comparing simulation data obtained from the first diesel full-engine model and the first in-cylinder combustion model with the existing experimental data to determine the accuracy of this first in-cylinder combustion model, establishing the in-cylinder combustion model using a direct injection Wiebe (DIWiebe) combustion model if the accuracy is unsatisfactory, and adjusting combustion parameters of the first in-cylinder combustion model using simulation data generated by this DIWiebe model to obtain a second in-cylinder combustion model;

S4, comparing simulation data obtained from the second in-cylinder combustion model with the existing experimental data to determine the accuracy of this second in-cylinder combustion model, entering S5 if the accuracy meets requirements, establishing the in-cylinder combustion model using thermodynamic process analysis (TPA) if not, and adjusting combustion parameters of the second in-cylinder combustion model using simulation data generated by this TPA model to obtain a third in-cylinder combustion model; and S5, verifying the experimental data using the constructed first diesel full-engine model and the simulation data obtained from the in-cylinder combustion models.

Additionally, according to the present disclosure, the verification method for high-speed diesel engine experimental data based on a quasi-dimensional combustion model may further include the following additional technical features.

In some of these implementations, S2 includes the steps of:

calculating an average value of the experimental heat release rate data over multiple engine cycles to obtain an averaged heat release rate;

performing fast Fourier transform (FFT) filtering on the averaged heat release rate; and calibrating and adjusting the combustion parameters of the selected combustion model based on the filtered data, to obtain the first in-cylinder combustion model.

In some of these implementations, S3 includes the steps of:

generating a cylinder pressure curve and a heat release rate curve via simulation using the first in-cylinder combustion model;

validating the simulated cylinder pressure curve with the existing experimental cylinder pressure curve, and the simulated heat release rate curve with the existing experimental heat release rate curve, to determine whether the agreement level of the cylinder pressure curve and the heat release rate curve meets corresponding requirements; and entering the next step if both meet the requirements; and re-validating the model's cylinder pressure curve and heat release rate curve if not; and comparing the simulated full-engine parameters with the existing experimental full-engine parameters to determine the difference between the two; and concluding that the accuracy of the first in-cylinder combustion model is unsatisfactory if the difference in the full-engine parameters exceeds a predefined threshold, and concluding that the accuracy is satisfactory if not.

In some of these implementations, the compared full-engine parameters include exhaust gas temperature, with a determination threshold of 15° C. for the temperature.

In some of these implementations, the heat release rate curve data are derived from experimentally measured cylinder pressure data through calculation using a heat transfer model.

In some of these implementations, the first diesel full-engine model includes intake and exhaust systems, a fuel injection system, a charge air cooler (CAC) system, a pressurization system, and a cylinder system.

In some of these implementations, in S2, the adjusting combustion parameters of the selected model includes synchronized adjustment of both fuel injection timing and start of combustion (SOC) timing.

In some of these implementations, in S3, the simulation data are compared with the existing experimental data, and during comparison of the simulated and experimental heat release rate curves, comparison parameters include timing, trend, and numerical values.

In some of these implementations, in S4, the establishing the in-cylinder combustion model using TPA, and adjusting combustion parameters of the second in-cylinder combustion model using simulation data generated by this TPA model includes the steps of:

- comparing whether the simulated heat release cutoff timing from the TPA in-cylinder combustion model matches exactly that from the DIWiebe in-cylinder combustion model; and
- entering the next step if matched, and recalibrating the cylinder pressure curve of the DIWiebe in-cylinder combustion model if mismatched;
- comparing whether a peak magnitude of the simulated heat release rate data from the TPA in-cylinder combustion model aligns with a peak magnitude of the experimental heat release rate data; and determining the experimental heat release rate data exhibits incomplete capture if so, and identifying abnormal fuel injection causing afterburning phenomena if not; and
- adjusting the combustion parameters of the second in-cylinder combustion model based on the determination results.

The embodiment of the present disclosure further provides a verification device for high-speed diesel engine experimental data based on a quasi-dimensional combustion model, including a processor, a memory, and a software program stored in the memory. When executed by the processor, the software program is capable of implementing the steps of the verification method for high-speed diesel engine experimental data based on a quasi-dimensional combustion model.

Compared to the related art, the present disclosure has the following beneficial effects.

In the embodiments of the present disclosure, the provided verification method for high-speed diesel engine experimental data based on a quasi-dimensional combustion model can determine the accuracy of the heat transfer model used for heat release rate calculation from cylinder pressure measurements during diesel engine testing, thereby enhancing fidelity of simulation calculations throughout the diesel engine testing, and clarifying whether a current in-cylinder combustion state in the diesel engine meets exhaust gas temperature (EGT) targets.

In the embodiments of the present disclosure, the provided verification method for high-speed diesel engine experimental data based on a quasi-dimensional combustion model can assess the accuracy of the experimental data without requiring repeated testing, thereby significantly reducing diesel engine development costs.

In the embodiments of the present disclosure, the provided verification method for high-speed diesel engine experimental data based on a quasi-dimensional combustion model can deliver accurate experimental data that enhance simulation accuracy, providing accurate in-cylinder combustion models for subsequent operations, such as full-engine performance optimization of the diesel engine, fuel injection system optimization, and pressurization system optimization, thereby facilitating the advancement of full-engine performance at the theoretical level.

In the embodiments of the present disclosure, the provided verification method for high-speed diesel engine experimental data based on a quasi-dimensional combustion model is specifically adapted for heat transfer model parameter verification during full-engine testing, and accuracy analysis of heat release rate data, ensuring in-cylinder combustion process accuracy, enhancing 1D simulation accuracy, thereby establishing the foundation for the full-engine performance simulation.

Additional aspects and advantages of the present disclosure will be partially presented in the following description, while others will become obvious from the following description, or be learned by the practice of the present disclosure.

DETAILED DESCRIPTION

Technical solutions in the embodiments of the present disclosure are further described clearly and completely below in combination with the accompanying drawings. Obviously, the embodiments described are only some, rather than all embodiments of the present disclosure. Based on the embodiments of the present disclosure, all other embodiments obtained by those ordinary skilled in the art without creative efforts fall within the scope of protection of the present disclosure.

The embodiments of the present disclosure are described in detail below in combination with the accompanying drawings through specific embodiments and application scenarios thereof.

In some embodiments of the present disclosure, a verification method for high-speed diesel engine experimental data based on a quasi-dimensional combustion model is provided. 1D simulation software GT-POWER is utilized, and a quasi-dimensional combustion model is employed to establish an in-cylinder combustion process. By calibrating cylinder pressure and heat release rate curves, and comparing simulation data with experimental data, the accuracy of the experimental data is determined. Based on accurate comparison results, issues within full-engine testing are analyzed, and problems existing in a diesel full-engine testing process are clarified, providing enterprises with guidance for optimizing subsequent tests, thereby saving diesel engine development costs and improving testing efficiency.

Figure 1:
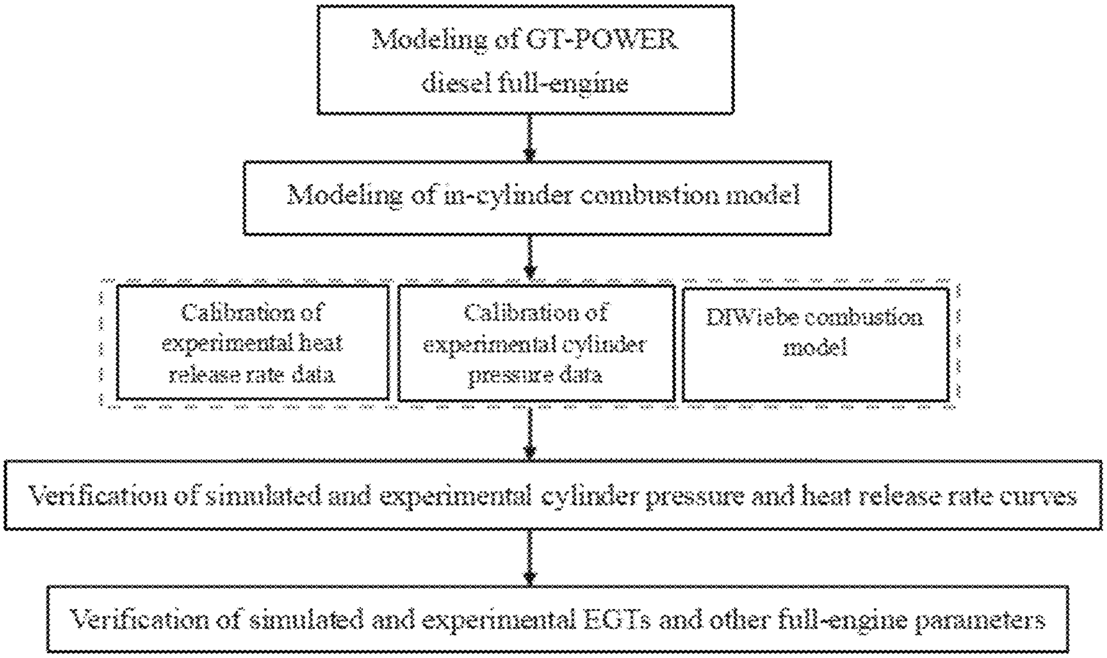
FIG. 1 shows a flowchart of experimental data verification of a diesel full-engine model based on GT-POWER according to an embodiment of the present disclosure.

In some embodiments of the present disclosure, referring to FIG. 1, a GT-POWER combustion model is adopted in the verification process of the GT-POWER-based diesel full-engine model. Based on certain diesel full-engine experimental data, a diesel engine subsystem model is established, including intake and exhaust systems, a fuel injection system, a CAC system, a pressurization system, and a cylinder system. Key parameters of the subsystem model are calibrated based on certain diesel engine experimental data. Following the completion of the above parameter calibration, an in-cylinder combustion model is selected based on the experimental cylinder pressure and heat release rate curves. The parameters of this in-cylinder combustion model are adjusted based on the experimental cylinder pressure and heat release rate data, ensuring that simulated cylinder pressure and heat release rate results match experimental cylinder pressure and heat release rate results. Specifically, the in-cylinder combustion model is calibrated using the experimental heat release rate curve, and the in-cylinder combustion model is calibrated using the experimental cylinder pressure data. After completing the calibration, the simulated cylinder pressure and heat release rate curves are verified against the experimental data. After successful verification of both cylinder pressure and heat release rate curves, if other parameters exhibit deviations within acceptable tolerances, this demonstrates that the simulation model can simulate the in-cylinder combustion process of the diesel full-engine testing. Calibration refers to the process of importing experimentally measured physical data, such as cylinder pressure and heat release data, into the model, where there is no need to set other parameters of the combustion model when calibrating a certain parameter. Validation and verification refer to the comparison of simulation data with experimental data to determine the degree of similarity. Based on the above modeling and calibration process, the verification method for high-speed diesel engine experimental data based on a quasi-dimensional combustion model is described according to the present disclosure. When the cylinder pressure and the heat release rate curves meet requirements, but other parameters exceed the acceptable tolerances, it is necessary to adjust the parameters of the in-cylinder combustion model. This adjustment may be performed sequentially based on the DIWiebe combustion model and a TPA combustion model.

Figure 2:
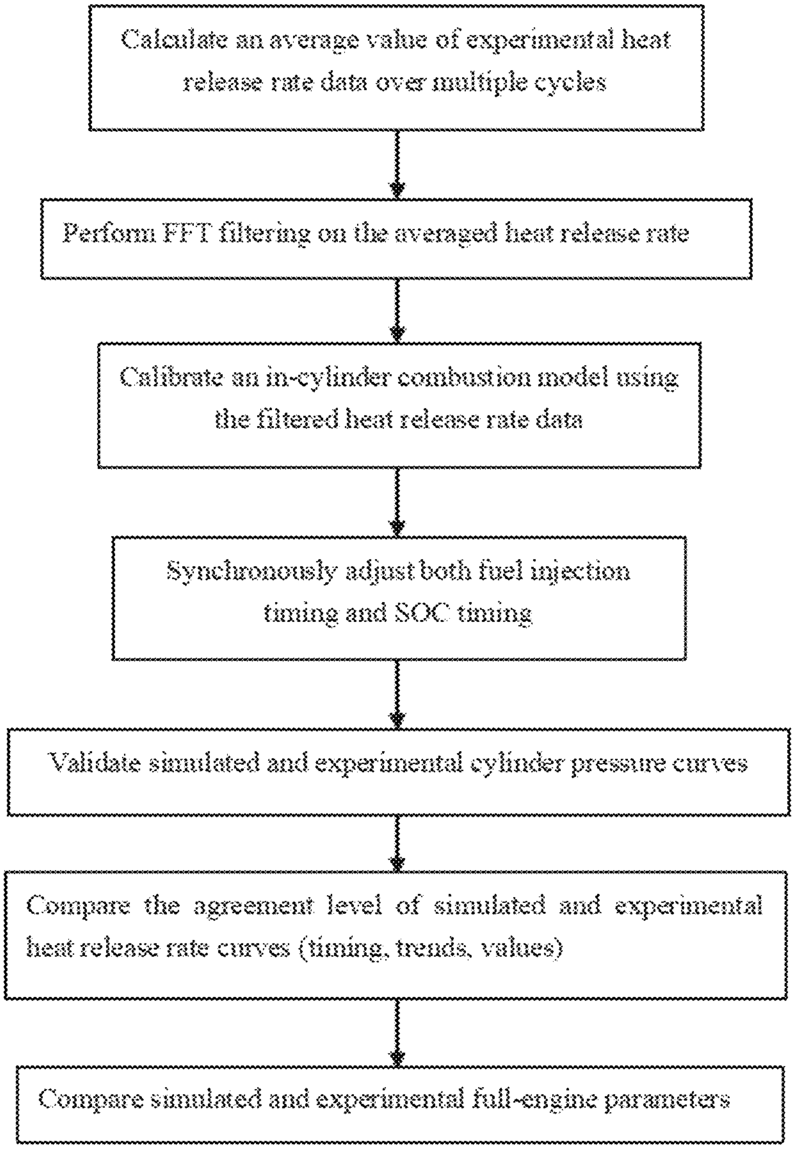
FIG. 2 shows a flowchart of experimental data verification for different quasi-dimensional combustion models according to an embodiment of the present disclosure.
Figure 3A:
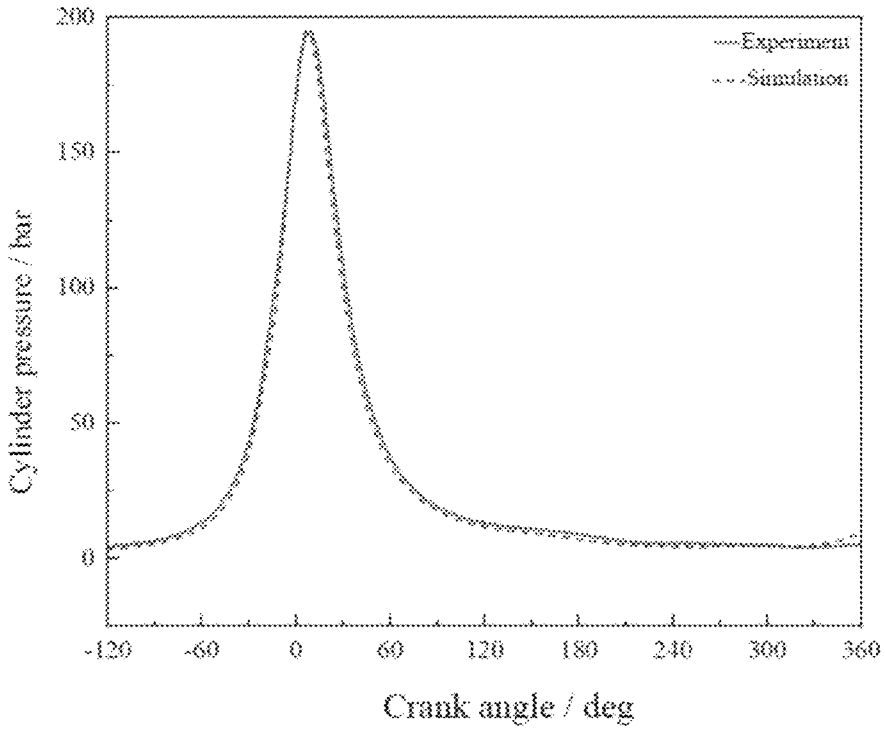
FIG. 3*a* shows a cylinder pressure verification result for in-cylinder combustion process modeling using heat release rate according to an embodiment of the present disclosure.
Figure 3B:
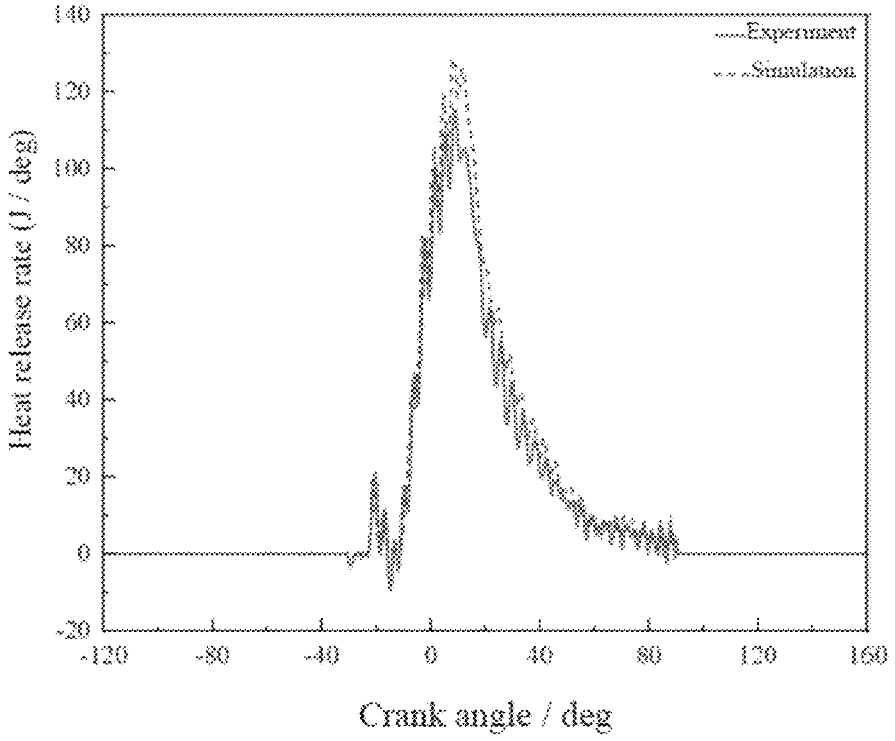
FIG. 3*b* shows a heat release rate verification result for in-cylinder combustion process modeling using heat release rate according to an embodiment of the present disclosure.

For verifying the experimental data of different quasi-dimensional combustion models (referring to FIG. 2), the heat release rate experimental data from multiple cycles are averaged, and the averaged heat release rate is processed via FFT filtering to obtain a smoothed heat release rate curve for calibrating the in-cylinder combustion model. After calibration of the in-cylinder combustion mode using the experimental heat release rate data, injector configuration parameters no longer influence simulation results, leaving only injection timing and SOC timing as adjustable parameters. Therefore, these two parameters of the injection timing and the SOC timing are adjusted accordingly. After completing these adjustments, simulations are rerun to calibrate the simulated cylinder pressure curve against the experimental cylinder pressure curve, alongside a comparison of the agreement level between the simulated and experimental heat release rate curves. The heat release rate curve is derived from experimentally measured cylinder pressure data using a heat transfer model. Theoretically, after calibrating the cylinder combustion model using this heat release rate curve, the simulated cylinder pressure and the heat release curves are expected to perfectly align with the experimental cylinder pressure and heat release curves. When comparing the heat release curves, the focus shall be placed on timing, trends, and critical values. When the comparison of both the cylinder pressure and heat release rate curves meets the requirements, the model is considered validated and can be applied to verify subsequent experimental data. Following the comparison of cylinder pressure and heat release rate curves, full-engine parameters, such as EGT, boost pressure, and intake air flow rate, are compared. Theoretically, the simulation results for these full-engine parameters are expected to exhibit close agreement with the experimental results. However, from the simulation results, it can be seen that after the cylinder pressure curve verification is completed, the simulated heat release rate curve is significantly higher than the experimental heat release rate curve (referring to FIGS. 3*a*-3*b*). Furthermore, the simulated EGT is well below the experimental data. Specifically, the simulated turbine inlet EGT is substantially lower than the experimental EGT. This result indicates significant error in the experimental heat release rate data, requiring inspection and verification.

Figure 4:
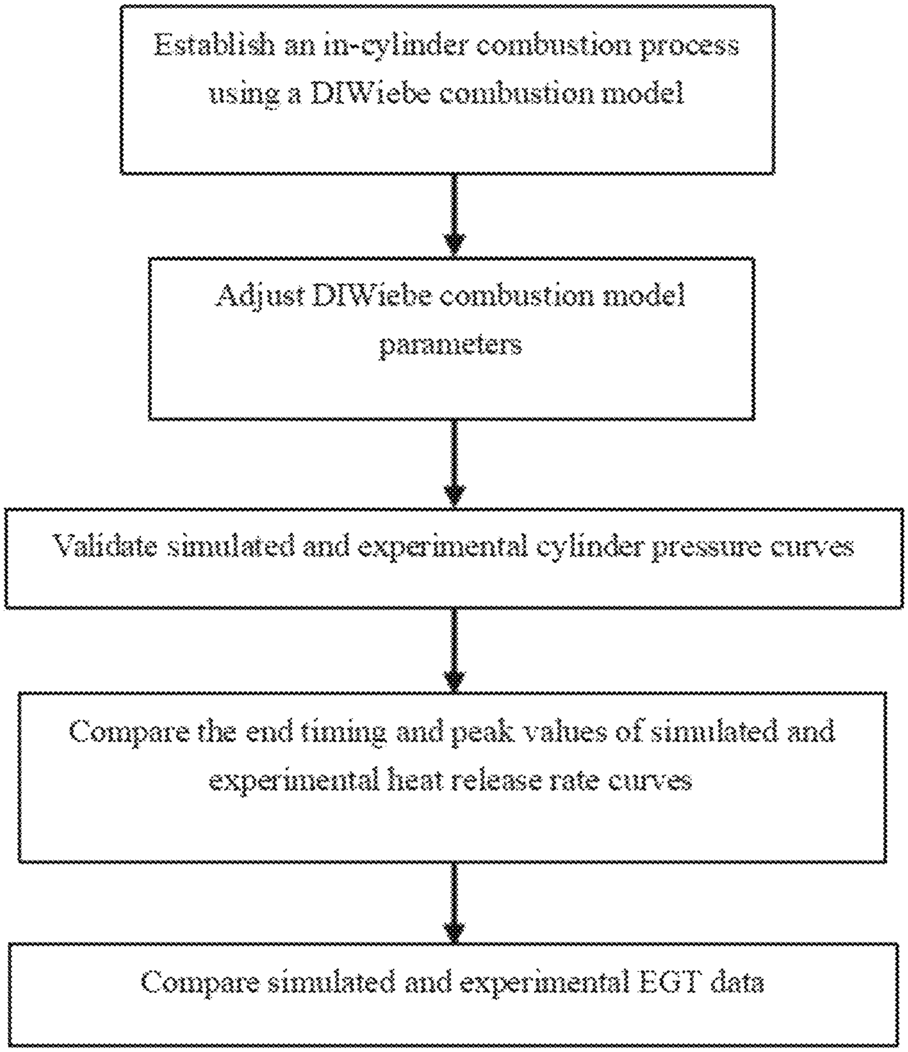
FIG. 4 is a flowchart of in-cylinder combustion modeling using a DIWiebe combustion model according to an embodiment of the present disclosure.

In some embodiments of the present disclosure, referring to FIG. 4, a process of modeling in-cylinder combustion using the DIWiebe combustion model includes the step that: the DIWiebe combustion model is selected to establish an in-cylinder combustion process, the simulated heat release rate data generated by this model is configured to replace the experimental heat release rate data for calibrating in-cylinder combustion, thereby achieving the adjustment of parameters of the combustion model. The simulated and experimental cylinder pressure curves are validated, and the end timing and peak values of the simulated and experimental heat release rate curves are compared. Finally, the simulated and experimental EGT data are compared.

Figure 5A:
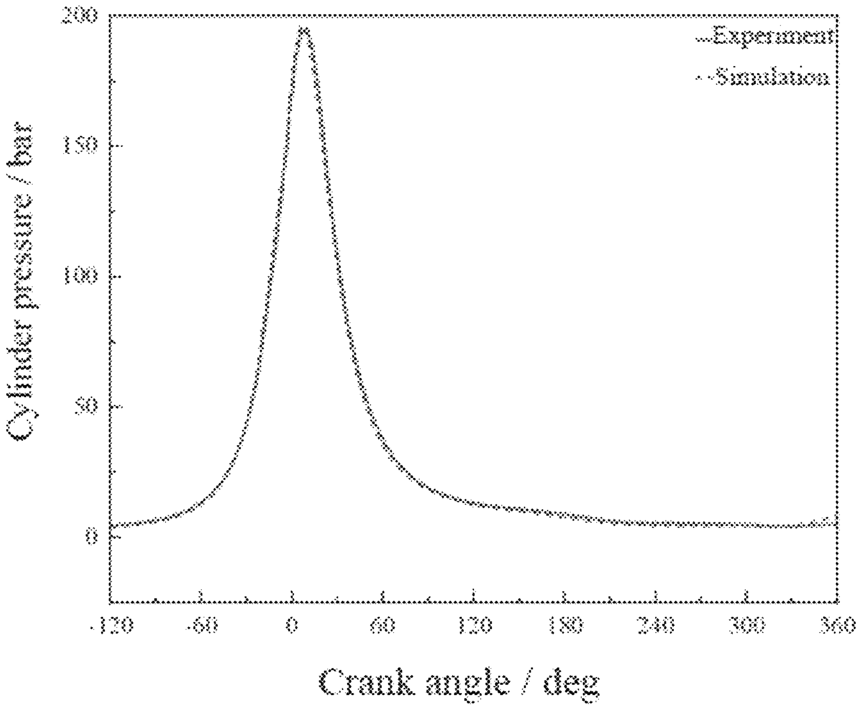
FIG. 5*a* shows a cylinder pressure verification result for in-cylinder combustion process modeling using a DIWiebe combustion model according to an embodiment of the present disclosure.
Figure 5B:
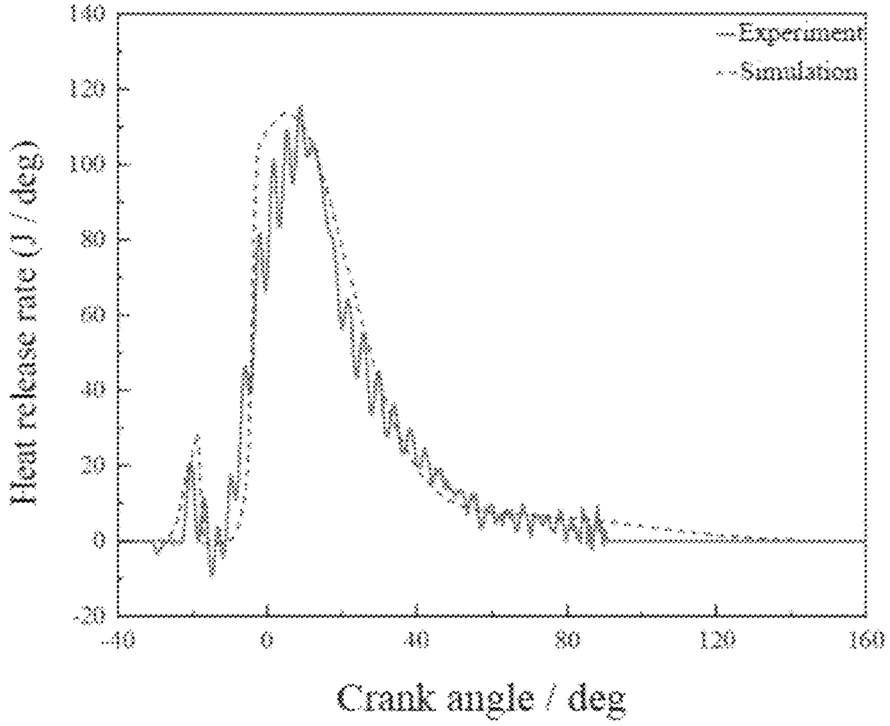
FIG. 5*b* shows a heat release rate verification result for in-cylinder combustion process modeling using a DIWiebe combustion model according to an embodiment of the present disclosure.

In this embodiment, referring to FIGS. 5*a*-5*b*, the DIWiebe combustion model achieves good agreement for the cylinder pressure curve. While the simulated heat release rate curve shows broad agreement with the experimental heat release rate curve, the simulated heat release duration is significantly longer than the experimental heat release duration. Furthermore, the simulated heat release rate curve is notably wider than the experimental heat release rate curve, indicating that the simulated in-cylinder heat release from combustion exceeds that experimental heat release from combustion. The simulated heat release naturally concludes at 140 deg, whereas the experimental heat release curve exhibits a truncated end at 90 deg. This discrepancy captured by the DIWiebe combustion model indicates missing data in the experimental heat release rate data. At the 90 deg position, the experimental heat release rate curve does not naturally decay to zero; instead, it exhibits an abrupt truncation to zero. This strongly suggests that the heat release calculation from the experimental cylinder pressure data is artificially terminated at 90 dge. Consequently, calibrating the in-cylinder combustion model with incomplete experimental heat release rate data is the primary reason the simulated EGT consistently remains significantly lower than the experimental value, even after achieving alignment and validation with the cylinder pressure curve.

The experimental results are as follows. Although the DIWiebe combustion model demonstrates general alignment with experimental data for most parameters, the simulated turbine inlet EGT is 48° C. lower than the measured value, indicating a significant deviation that cannot be ignored. This demonstrates that the heat release rate curve calculated by the DIWiebe combustion model can only confirm the existence of premature truncation in the experimental heat release rate curve, and it cannot determine the actual timing of truncation for the heat release curve. Furthermore, although the cylinder pressure curve calibration shows near-perfect agreement with experimental data, the simulated heat release rate curve exhibits significantly greater width compared to the experimental heat release rate. However, the simulated turbine inlet EGT remains substantially lower than the measured value—a result that contradicts fundamental thermodynamic principles. This implies that either the experimental heat release rate is artificially set to zero at a time later than 140 deg, or the calculated experimental heat release rate is significantly lower than the true in-cylinder combustion value. Since the heat release rate curve is derived directly from the measured cylinder pressure curve, and assuming other system calibrations are correct, the observed contradictions strongly suggest abnormal fuel injection, which likely causes significant in-cylinder afterburning and potentially even combustion extending into an exhaust manifold. Therefore, a combustion analyzer in the experiment can only capture the heat released from in-cylinder fuel combustion, but cannot capture the heat released from fuel combustion entering the exhaust manifold. Consequently, it is necessary to replace the combustion model and recalculate the heat release rate.

In some embodiments of the present disclosure, the experimental cylinder pressure data is used for the modeling of in-cylinder combustion, also known as TPA-calibrated in-cylinder combustion. The heat release rate curve is derived from the cylinder pressure curve based on an energy conservation law. If an exhaust manifold combustion occurs, the heat release rate curve will be significantly lower. The experimental cylinder pressure curve can most directly demonstrate the in-cylinder combustion process. Therefore, the present disclosure attempts to directly model the in-cylinder combustion process using TPA experimental cylinder data. In a method of establishing an in-cylinder combustion model based on experimental cylinder pressure data, the cylinder pressure curve is measured directly from experiments, while the heat release rate curve is obtained through analysis using an in-cylinder heat transfer model. Therefore, the cylinder pressure curve is the experimental parameter that most closely represents the actual process in a diesel engine. The experimental cylinder pressure curves from multiple cycles are averaged. Based on this averaged pressure, FFT-based smoothing filtering is applied to obtain the cylinder pressure curve for modeling the combustion process.

Figure 6:
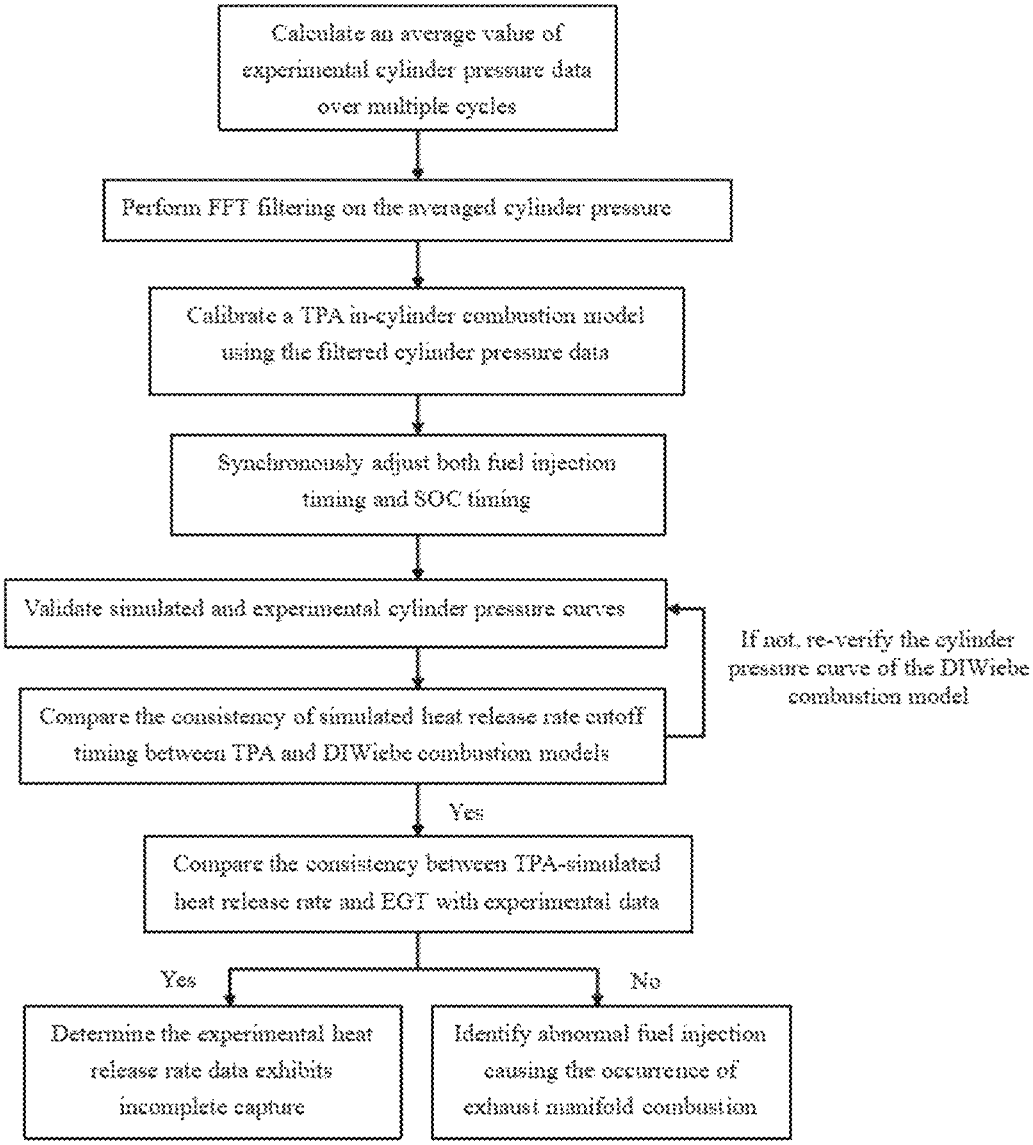
FIG. 6 is a flowchart of in-cylinder combustion modeling using TPA according to an embodiment of the present disclosure.

In this embodiment, referring to FIG. 6, the process for TPA modeling of in-cylinder combustion includes the steps that: the experimental cylinder pressure data from multiple cycles are averaged; FFT-based filtering is performed on the averaged cylinder pressure; a TPA in-cylinder combustion model is calibrated using the filtered cylinder pressure data; the fuel injection timing is adjusted; the simulated and experimental cylinder pressure curves are validated to ensure the simulated SOC timing matches the experimental SOC timing; the consistency between the heat release rate curve derived from TPA simulation and the experimentally obtained test heat release rate curve is compared, and if consistent, verification of full-engine parameters is conducted; if inconsistent, adjustment of cylinder heat transfer model parameters is required, primarily involving piston convective heat transfer coefficient, cylinder convective heat transfer coefficient, and valve convective heat transfer coefficient, and adjustment references full-engine characteristic parameters, including power, torque, fuel consumption rate, peak pressure, pre-intercooler temperature, post-intercooler pressure, and turbine inlet and outlet EGTs; if all full-engine parameters have been correctly verified and both the simulated cylinder pressure curve and heat release rate curve match the experimental data, this demonstrates that the cylinder pressure and heat release rate data obtained during testing are reliable and accurate; and if the cylinder pressure curve verification is confirmed but the simulated heat release rate curve is significantly higher than the experimental curve, and all other full-engine parameters match except that the simulated turbine inlet and outlet EGTs are notably lower than the experimental values, this indicates the occurrence of excessive afterburning, primarily due to combustion in the exhaust manifold.

Figure 7A:
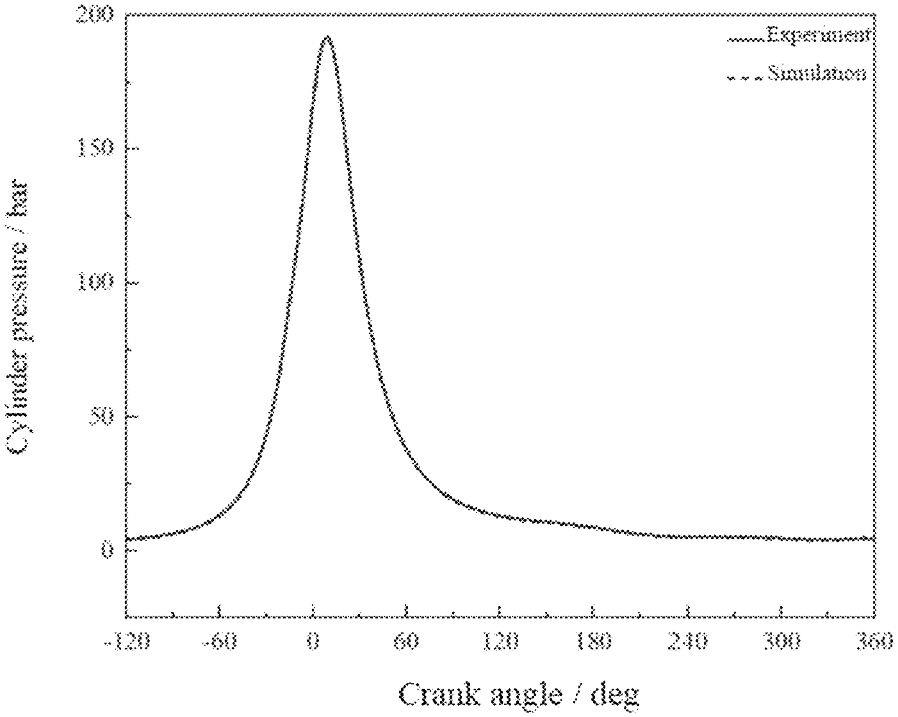
FIG. 7*a* shows a cylinder pressure verification result for in-cylinder combustion modeling using TPA according to an embodiment of the present disclosure.
Figure 7B:
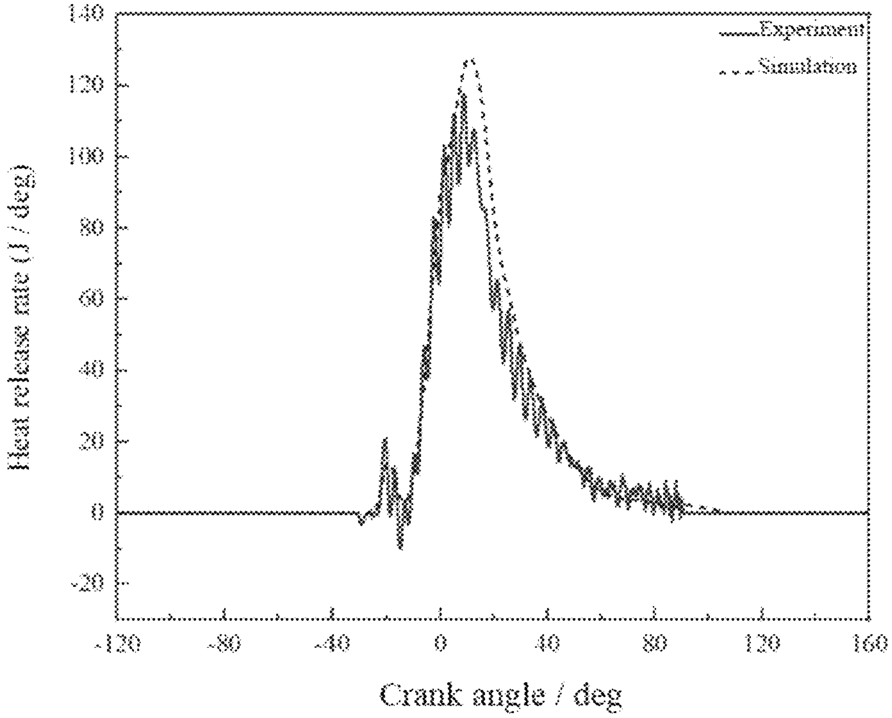
FIG. 7*b* shows a heat release rate verification result for in-cylinder combustion modeling using TPA according to an embodiment of the present disclosure.

Referring to FIGS. 7*a*-7*b*, the simulated cylinder pressure results from the TPA-based model match the experimental results perfectly. However, a peak value of the simulated heat release rate is significantly higher than that of the experimental heat release rate. Furthermore, similar to the DIWiebe combustion model simulation, the simulated heat release also concludes abruptly at 140 deg. This confirms that an extreme combustion event occurs during testing due to an abnormal fuel injection event, specifically an occurrence of extreme exhaust manifold combustion. Cyclic fuel quantities under GT-POWER simulation software default settings are all within ideal in-cylinder combustion conditions. TPA calibration provides the most accurate representation of experimental combustion processes. After verifying the accuracy of full-engine parameters, the experimental heat release rate curve remains significantly lower while the simulated exhaust temperature is notably lower than expected, confirming the occurrence of extreme exhaust manifold combustion. Simultaneously, since TPA modeling of in-cylinder combustion is theoretically the most accurate approach, and the heat release rate curve derived from the TPA method exhibits late-stage heat release phenomena, it can be confirmed that the experimental heat release rate curve suffers from premature truncation.

The comparative analysis of different in-cylinder modeling processes reveals that after obtaining the experimental cylinder pressure and heat release rate curves, the following sequence can be adopted to establish an in-cylinder combustion model, thereby verifying the accuracy of the experimental curves.

(1) Modeling in-cylinder combustion using the experimental heat release rate data: after verifying the accuracy of cylinder pressure curves, if the simulation results of diesel full-engine parameters largely match the experimental data, it can be deemed that the experimentally obtained cylinder pressure and heat release rate curves are accurate. Conversely, if significant discrepancies exist between the simulation results and the experimental results for parameters like EGT after cylinder pressure curve verification, this indicates substantial errors in the experimental heat release rate curve. The discrepancies are primarily concentrated in two aspects: the heat transfer parameters of the calculated heat release rate model, and the truncation timing for heat release rate calculation.

(2) Modeling in-cylinder combustion using the DIWiebe combustion model: the DIWiebe combustion parameters are adjusted, and the cylinder pressure curves are verified. After completing cylinder pressure curve verification, the simulated and experimental heat release rate curves are compared to analyze the truncation position of the heat release rate curves. If crank angles corresponding to the simulated and experimental heat release rate truncations are substantially consistent, it indicates the experimental heat release rate truncation timing is accurate. However, if there is a significant deviation, it implies errors in the truncation timing, necessitating further verification using TPA cylinder pressure calibration. After completing the verification of heat release rate truncation timing, the simulated and experimental EGT and other parameters are compared. If the simulated EGT is significantly lower than the experimental EGT but the simulated heat release rate curve exceeds the experimental curve, this indicates that there is a serious afterburning phenomenon.

(3) Modeling in-cylinder combustion using the TPA experimental heat release rate data: the experimental cylinder pressure data provides the closest approximation to in-cylinder combustion conditions during diesel engine testing. Therefore, the heat release rate calculated via TPA calibration of the in-cylinder combustion process represents the most accurate heat release rate data available. At this time, the simulated and experimental heat release rate data are compared. If the heat release rate truncation position calculated by the DIWiebe combustion model aligns with the experimental truncation position, it demonstrates that the DIWiebe combustion model accurately predicts the heat release rate curve's termination point. At this time, TPA-calculated heat release rate values are compared with the experimental heat release rate data and the full-engine parameters. If substantially consistent, it indicates the experimental data is accurate. However, if significant discrepancies exist between the TPA-calculated and the experimental heat release rate values, this suggests abnormal combustion processes during the testing. In such cases, an actual heat release rate shall be determined by values derived by the TPA calibration.

Portions of the present disclosure not specified in detail may refer to the related art in the field or the widely-known technology for those skilled in the art.

The embodiments of the present disclosure have been described above with reference to the accompanying drawings, but the present disclosure is not limited to the above specific implementations. The above implementations are merely illustrative rather than restrictive. Guided by the present disclosure, a person skilled in the art may derive multiple forms without departing from the purpose of the present disclosure or the scope protected by the claims, all of which fall within the scope of the protection of the present disclosure.

The invention claimed is:

1. A verification method for high-speed diesel engine experimental data based on a quasi-dimensional combustion model, comprising the steps of:

S1, establishing a first diesel full-engine model using a GT-POWER combustion model based on existing data from diesel full-engine testing, S2, selecting an in-cylinder combustion model based on existing experimental cylinder pressure data and heat release rate curve data, and adjusting combustion parameters of the selected model to obtain a first in-cylinder combustion model, S3, comparing simulation data obtained from the first diesel full-engine model and the first in-cylinder combustion model with the existing experimental data to determine the accuracy of this first in-cylinder combustion model, establishing the in-cylinder combustion model using a direct injection Wiebe (DIWiebe) combustion model if the accuracy is unsatisfactory, and adjusting combustion parameters of the first in-cylinder combustion model using simulation data generated by this DIWiebe model to obtain a second in-cylinder combustion model, S4, comparing simulation data obtained from the second in-cylinder combustion model with the existing experimental data to determine the accuracy of this second in-cylinder combustion model, entering S5 if the accuracy meets requirements, establishing the in-cylinder combustion model using thermodynamic process analysis (TPA) if not, and adjusting combustion parameters of the second in-cylinder combustion model using simulation data generated by this TPA model to obtain a third in-cylinder combustion model, and S5, verifying the experimental data using the constructed first diesel full-engine model and the simulation data obtained from the in-cylinder combustion models; wherein S2 comprises the steps of:

calculating an average value of the experimental heat release rate data over multiple engine cycles to obtain an averaged heat release rate;

performing fast Fourier transform (FFT) filtering on the averaged heat release rate; and calibrating and adjusting the combustion parameters of the selected combustion model based on the filtered data, to obtain the first in-cylinder combustion model;

S3 comprises the steps of:

generating a cylinder pressure curve and a heat release rate curve via simulation using the first in-cylinder combustion model;

validating the simulated cylinder pressure curve with the existing experimental cylinder pressure curve, and the simulated heat release rate curve with the existing experimental heat release rate curve, to determine whether the agreement level of the cylinder pressure curve and the heat release rate curve meets corresponding requirements; and entering the next step if both meet the requirements; and recalibrating the model's cylinder pressure curve and heat release rate curve if not; and comparing the simulated full-engine parameters with the existing experimental full-engine parameters to determine the difference between the two; and concluding that the accuracy of the first in-cylinder combustion model is unsatisfactory if the difference in the full-engine parameters exceeds a predefined threshold, and concluding that the accuracy is satisfactory if not; and in S4, the establishing the in-cylinder combustion model using TPA, and adjusting combustion parameters of the second in-cylinder combustion model using simulation data generated by this TPA model, comprising the steps of:

comparing whether the simulated heat release cutoff timing from the TPA in-cylinder combustion model matches exactly that from the DIWiebe in-cylinder combustion model; and entering the next step if matched, and re-validating the cylinder pressure curve of the DIWiebe in-cylinder combustion model if mismatched;

comparing whether a peak magnitude of the simulated heat release rate data from the TPA in-cylinder combustion model aligns with a peak magnitude of the experimental heat release rate data; and determining the experimental heat release rate data exhibits incomplete capture if so, and identifying abnormal fuel injection causing afterburning phenomena if not; and adjusting the combustion parameters of the second in-cylinder combustion model based on the determination results.

2. The verification method for high-speed diesel engine experimental data based on a quasi-dimensional combustion model according to claim 1, wherein the compared full-engine parameters comprise exhaust gas temperature, with a determination threshold of 15° C. for the temperature.

3. The verification method for high-speed diesel engine experimental data based on a quasi-dimensional combustion model according to claim 1, wherein the heat release rate curve data are derived from experimentally measured cylinder pressure data through a calculation using a heat transfer model.

4. The verification method for high-speed diesel engine experimental data based on a quasi-dimensional combustion model according to claim 1, wherein the first diesel full-engine model comprises intake and exhaust systems, a fuel injection system, a charge air cooler (CAC) system, a pressurization system, and a cylinder system.

5. The verification method for high-speed diesel engine experimental data based on a quasi-dimensional combustion model according to claim 1, wherein in S2, the adjusting combustion parameters of the selected model comprises synchronized adjustment of both fuel injection timing and start of combustion (SOC) timing.

6. The verification method for high-speed diesel engine experimental data based on a quasi-dimensional combustion model according to claim 1, wherein in S3, the simulation data are compared with the existing experimental data; and during comparison of the simulated and experimental heat release rate curves, comparison parameters comprise timing, trend, and numerical values.

* * * * *